United States Patent [19]  
Watanabe

[11] Patent Number: 4,642,474  
[45] Date of Patent: Feb. 10, 1987

[54] ELEVATOR RESCUE APPARATUS DURING STOPPAGE OF POWER SUPPLY
[75] Inventor: Eiki Watanabe, Inazawa, Japan
[73] Assignee: Mitsubishi Denki Kabushiki Kaisha, Tokyo, Japan
[21] Appl. No.: 838,586
[22] Filed: Mar. 11, 1986
[30] Foreign Application Priority Data Mar. 13, 1985 [JP] Japan .................................. 60-49920

[51] Int. Cl.$^4$ ........................... H02J 9/04; B66B 5/02
[52] U.S. Cl. ....................................... 307/64; 187/114
[58] Field of Search ................ 187/29 R; 307/48, 64, 307/66

[56] References Cited

U.S. PATENT DOCUMENTS

| 4,209,082 | 6/1980 | Anlai et al. | 187/29 R |
| 4,316,097 | 2/1982 | Reynolds | 187/29 K |
| 4,376,471 | 3/1983 | Uchino et al. | 187/29 R |
| 4,484,664 | 11/1984 | Nomura | 187/29 R |
| 4,519,479 | 5/1985 | Tanahasik | 187/29 R |
| 4,566,766 | 3/1985 | Watanabe | 187/29 R |

FOREIGN PATENT DOCUMENTS 59-102770  6/1984  Japan .

Primary Examiner—Vit W. Miska  
Attorney, Agent, or Firm—Leydig, Voit & Voit

[57] ABSTRACT

Series circuits consisting of diodes for blocking reverse currents are inserted between the upper and lower arms of bridge-connected transistors constituting an inverter, and contacts of a contactor adapted to close upon a stoppage of power supply are respectively connected in parallel with the series circuits so as to short-circuit the series circuits of the diodes, whereby the inverter is changed-over from a current type inverter to a voltage type inverter upon the stoppage of the power supply. Thus, even in an elevator employing the current type inverter, a rescue operation during the stoppage of the power supply can be performed with a simple circuit arrangement employing a D.C. power source.

6 Claims, 3 Drawing Figures

ELEVATOR RESCUE APPARATUS DURING STOPPAGE OF POWER SUPPLY

BACKGROUND OF THE INVENTION

This invention relates to an elevator rescue apparatus during the stoppage of power supply according to which a power-failure rescue circuit can be installed even when a current type inverter is employed.

In recent years, with the progress of control technology, the VVVF (variable-voltage and variable-frequency) control system has come into adoption also for elevator control apparatuses. The basic forms of this VVVF control system includes two types; the voltage type and the current type.

Of them, the former voltage type is arranged as shown in FIG. 2. This figure illustrates an example in which a power-failure rescue ciruit is applied to a conventional voltage type VVVF control system. Letters R, S and T in FIG. 2 indicate the respective phases of a three-phase A.C. power source not shown.

The phases R, S and T are connected to the corresponding input ends of converters 2 and 3 through the contacts 1 of a contactor. Each of the converters 2 and 3 constructs a three-phase bridge circuit out of thyristors SCR, and these converters 2 and 3 are connected in parallel.

A smoothing capacitor 4 is connected across the output ends of the converters 2 and 3, and a D.C. voltage obtained by rectifying three-phase A.C. power by means of the converter 2 is smoothed by the smoothing capacitor 4. The converter 3 is operated during the regeneration of an induction motor 6.

The output voltage of the converter 2 is applied to an inverter 5. The inverter 5 is constructed of transistors TR and diodes D. The diode D is connected across the emitter and collector of the corresponding transistor TR, and is formed unitarily with this transistor.

The inverter 5 inverts the output voltage of the converter 2 into a three-phase A.C. voltage of predetermined frequency and predetermined voltage value, with which the induction motor 6 is driven. The cage (not shown) of an elevator is driven by the induction motor 6.

In addition, the input ends of the converter 2 are connected to the input end of a charging circuit 8 through a transformer 7. The output of the charging circuit 8 is used for charging a battery 9. The anode of the battery 9 is connected to the positive side output end of the converters 2 and 3 through the contact 10 of a contactor, while the cathode of the battery 9 is connected to the negative side output end of the converters 2 and 3. The battery 9 is the power source of the rescue circuit in the case of the failure of the power supply.

Next, the operation of the prior-art system will be described. While the power supply is normal, the contacts 1 of the contactor are closed and the contact 10 of the contactor is open. Owing to the closure of the contacts 1 of the contactor, the voltages of the respective phases R, S and T of the three-phase A.C. power source are applied to the converter 2 and are converted into the D.C. voltage.

This D.C. voltage is smoothed by the smoothing capacitor 4, and is applied to the inverter 5. In the inverter 5, the smoothed D.C. voltage is inverted into the A.C. power of desired frequency and desired voltage by the use of the pulse width modulation technique, and the resulting A.C. power is fed to the induction motor 6.

Thus, the induction motor 6 is driven to run the cage of the elevator. Since the technique of such a VVVF control is well known, it shall not be detailed here.

Assuming now that the converter 2 be used for the power operation in the up direction of the cage, the converter 3 is used for the regenerative operation. In this manner, the polarity of the voltage across both the terminals of the smoothing capacitor 4 remains unchanged, so that the direction of the current is inverted in accordance with the power or regenerative operation.

Meanwhile, when the power supply has stopped, the contacts 1 of the contactor are opened, and the contact 10 of the contactor is closed instead. At this time the electric power of the battery 9 is connected to the D.C. circuit through the contact 10 of the contactor, and it is inverted into A.C. power of variable voltage and variable frequency by the inverter 5. The subsequent operation is the same as in the case of the normal power supply.

The polarity of the voltage of the D.C. circuit shown in FIG. 2 is fixed, and the current direction thereof is inverted with the four-quadrant running of the power and regenerative operations.

In contrast, according to the current type, the current direction of a D.C. circiuit is fixed, and the voltage polarity thereof is inverted with the four-quadrant running. FIG. 3 shows an example of a system of the current type, in which the same portions as in FIG. 2 are assigned identical symbols.

The voltages of the respective phases R, S and T of a three-phase A.C. power source are applied to the input ends of a converter 2 through the contacts 1 of a contactor. The converter 2 constructs a three-phase bridge circuit in such a way that a diode D1 is connected in series with each of parallel circuits consisting of transistors TR and diodes D.

The output of the converter 2 is fed to an inverter 5 through a reactor 11. The inverter 5 is constructed of transistors TR and diodes D and D1 similarly to the converter 2. The inverter 5 inverts the D.C. output of the converter 2 into A.C. power of variable frequency and variable voltage, with which an induction motor 6 is driven.

This system of FIG. 3 differs from the system of FIG. 2 in that, since the diodes D1 are respectively connected to the transistors TR of the converter 2 and the inverter 5, the current direction remains unchanged, whereas the voltage polarity of the D.C. circuit is inverted in accordance with the power or regenerative operation.

As compared with the voltage type inverter shown in FIG. 2, this current type inverter shown in FIG. 3 does not include an element of short lifetime such as the capacitor (an electrolytic capacitor has a short lifetime).

Regarding the number of constituent elements, the voltage type inverter requires the thyristors and transistors totaling 18, whereas the current type inverter may include 12 such elements (the diodes are not taken into consideration because they are inexpensive). Accordingly, the current type is meritorious in economy etc. and will be increasingly adopted in the future.

The current type inverter, however, has had the disadvantage that a battery cannot be connected to the D.C. circuit at the time of the failure of the power supply because the voltage polarity changes.

SUMMARY OF THE INVENTION

This invention has been made in order to solve the problem mentioned above, and has for its object to provide an elevator rescue apparatus during a stoppage of power supply in which a rescue circuit can be connected even to a current type inverter at the stoppage of power supply by the use of a simple arrangement.

The elevator rescue apparatus during the stoppage of power supply according to this invention comprises series diodes for blocking reverse currrents, which are respectively connected between the upper and lower arms of bridge-connected transistors constituting an inverter, and contacts of a contactor which are respectively connected in parallel with the series diode circuits.

In this invention, when the power supply has stopped, the contacts of contactors are closed to short-circuit the series diode circuits and to simultaneously connect a battery to the D.C. circuit.

DESCRIPTION OF THE PREFERRED EMBODIMENT

Figure 1:
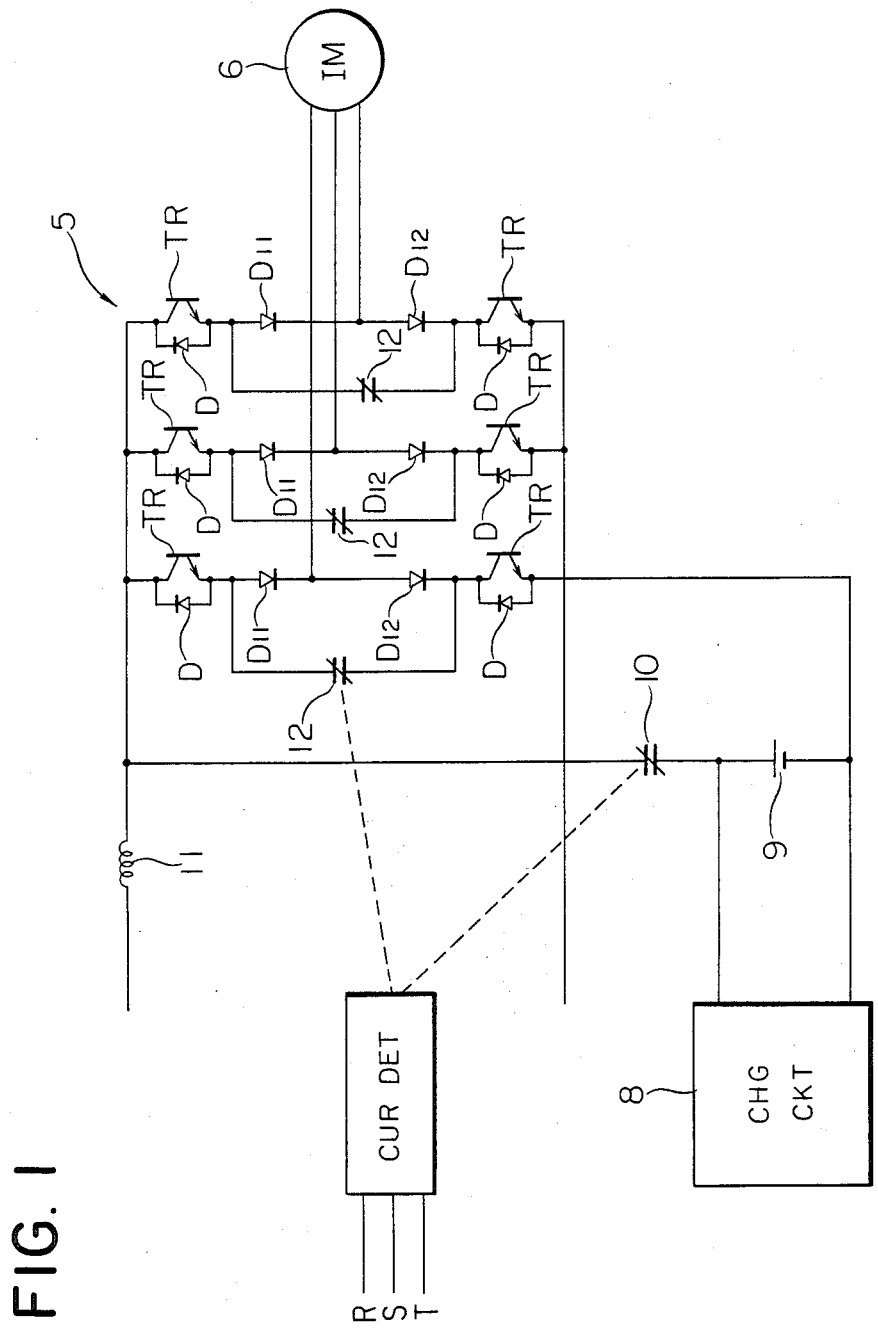
FIG.1 is a circuit diagram of the essential portions of an embodiment of an elevator rescue apparatus during a stoppage of power supply according to this invention.
Figure 2:
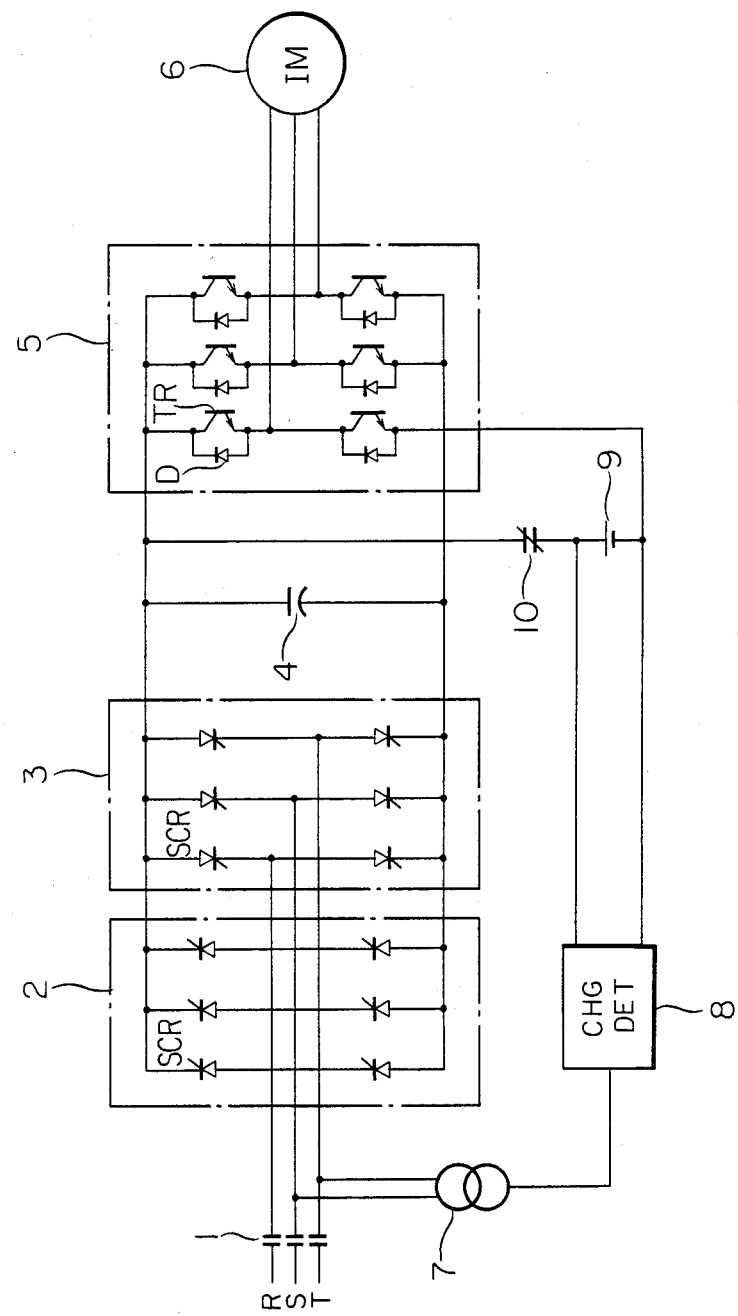
FIG. 2 is a circuit diagram of an elevator control apparatus which uses an inverter based on a variable-voltage and variable-frequency control system of a conventional voltage type.

Now, an embodiment of an elevator rescue apparatus during a stoppage of power supply according to this invention will be described with reference to the drawings. FIG. 1 is a circuit diagram of the embodiment. In FIG. 1, the same portions as in FIGS. 2 and 3 are assigned identical symbols.

Figure 3:
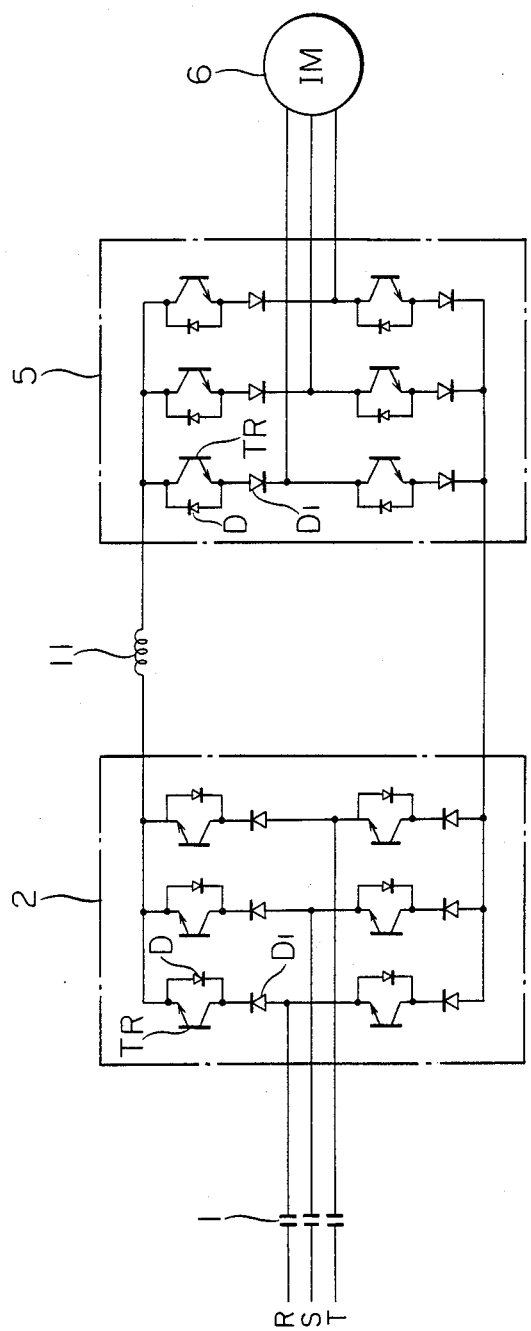
FIG. 3 is a circuit diagram of an elevator control apparatus which uses an inverter based on a variable-voltage and variable-frequency control system of a conventional current type.

In the embodiment of FIG. 1, a charging circuit 8, a battery 9, contactors with contacts 10 and 12, and diodes D11 and D12 are added anew to the circuit arrangement of FIG. 3. Although no illustration is given in FIG. 1, A.C. voltages are applied from the respective phases R, S and T of a three-phase A.C. power source to a converter 2 through the contacts 1 of a contactor as shown in FIG. 3, to convert the A.C. power into D.C. power by means of the converter 2. Thereafter, the D.C. power is applied to an inverter 5 through a reactor 11. As the converter 2, one shown in FIG. 3 is used.

The inverter 5 inverts the D.C. power into A.C. power of variable frequency and variable voltage, with which an induction motor 6 is driven. Particularly, the inverter 5 has transistors TR connected into a three-phase bridge, and the diodes D11 and D12 for blocking a reverse current are connected in series between the upper and lower arms of each phase of the transistors TR so as to form a series circuit.

The node between the diodes D11 and D12 is connected to the induction motor 6. The contacts 12 of the contactor are respectively connected in parallel with the series circuits each consisting of the diode D11 and the diode D12.

The contacts 10 and 12 of the contactors are open while the power supply is normal, and they are simultaneously closed when the power supply has stopped. The contactors having these contacts are controlled according to the presence or absence of the output of a current detector which is inserted in at least one of the lines of the phases R, S and T of the three-phase A.C. power source. In the presence of the output of the current detector, the power source is decided normal, and the contactors are energized to open the contacts 10 and 12 thereof. To the contrary, in the absence of the output of the current detector, the power source is decided abnormal, and the contactors are deenergized to close the contacts 10 and 12 thereof.

In addition, the output ends of the charging circuit 8 are connected to both the anode and cathode of the battery 9. This battery 9 serves as the power source of the circuit for rescuing persons in the cage of the elevator during the failure of the power supply. The cathode of the battery 9 is connected to the negative side output end of the converter 2, while the anode thereof is connected through the contact 10 of the contactor to the positive side of the D.C. circuit, namely, the node between the reactor 11 and the positive side input end of the inverter 5.

Owing to such an arrangement, when the power supply has stopped, the contacts 10 and 12 of the contactors are simultaneously closed, and the battery 9 is connected across the D.C. circuit, i.e., across the input ends of the inverter 5. At the same time, the series circuits consisting of the diodes D11 and D12 are short-circuited by the contacts 12 of the contactor.

Thus, the inverter 5 is changed-over from the current type into the voltage type and operates similarly to that shown in FIG. 2, so that the rescue running of the cage can be performed with the battery 9.

As thus far described, according to this invention, series circuits consisting of diodes for blocking reverse currents are inserted between the upper and lower arms of bridge-connected transistors constituting an inverter, and contacts of a contactor adapted to close upon a stoppage of power supply are connected in parallel with the series circuits so as to short-circuit the series circuits of the diodes to the end of changing-over the inverter from a current type inverter to a voltage type inverter. With the simple arrangement, therefore, passengers in the cage of an elevator can be rescued during the stoppage of the power supply even when the current type inverter is used.

What is claimed is:

1. An elevator having a rescue apparatus during a stoppage of power supply, the apparatus operating the elevator with an emergency power source while the A.C. power source is abnormal; comprising:
   (a) a converter which converts alternating current of the A.C. power source into direct current,
   (b) an inverter which is connected to said converter and which inverts the direct current into alternating current,
   said inverter being constructed of a bridge circuit in which a plurality of arms are connected in parallel, said each arm being composed of a pair of transistors connected in series and a pair of diodes inserted between said pair of transistors and connected in series in the same polarity as that of the series transistor circuit,
   nodes of the pairs of diodes being respectively connected to a motor for driving a cage of the elevator, to feed the motor with the alternating current of variable voltage and variable frequency,
(c) the emergency D.C. power source which is connected across D.C. side input parts of said inverter,
(d) first switching means inserted between said emergency D.C. power source and said inverter, said means being held in an open state while said A.C. power source is normal and being brought into a closed state to electrically connect said emergency D.C. power source to said inverter when said A.C. power source has become abnormal, and
(e) second switching means connected in parallel with said pair of diodes of said each arm, said means being held in an open state to keep said pair of diodes effective while said A.C. power source is normal and being brought into a closed state to form a circuit bypassing said pair of diodes and to keep a voltage polarity of a D.C. side of said inverter unchanged when said A.C. power source has become abnormal.

2. An elevator according to claim 1, wherein a diode is connected in parallel with each of said pair of transistors and between an emitter and a collector thereof so as to have a polarity opposite to that of the corresponding transistor, and said second switching means has both its ends connected between said pair of diodes and the diodes respectively connected in parallel with said pair of transistors and in the polarity opposite to that of said pair of transistors and is thus connected in parallel with said pair of diodes.

3. An elevator according to claim 1, wherein said first switching means and said second switching means are changed-over into the closed states at the same time that said A.C. power source has become abnormal.

4. An elevator according to claim 1, wherein said first switching means is inserted between a positive terminal of said emergency D.C. power source and a positive terminal of the D.C. side of said inverter.

5. An elevator according to claim 1, wherein said first and second switching means are constructed of a contactor, and said contactor is controlled by a current detector which is disposed for detecting a state of said A.C. power source.

6. an elevator according to claim 5, wherein said contactor has normally-open contacts which are closed when said contactor is deenergized, and which are inserted between said emergency D.C. power source and said inverter and connected in parallel with the respective pairs of diodes.

* * * * *